(12) United States Patent
Chen et al.

(10) Patent No.: US 12,466,650 B2
(45) Date of Patent: Nov. 11, 2025

(54) INTELLIGENT SORTING SYSTEM AND METHOD, WAREHOUSE ROBOT, AND PROCESSING TERMINAL

(71) Applicant: HAI ROBOTICS CO., LTD., Guangdong (CN)

(72) Inventors: Yuqi Chen, Guangdong (CN); Xiaolong Li, Guangdong (CN)

(73) Assignee: HAI ROBOTICS CO., LTD., Shenzhen (CN)

( * ) Notice: Subject to any disclaimer, the term of this patent is extended or adjusted under 35 U.S.C. 154(b) by 916 days.

(21) Appl. No.: 17/591,117

(22) Filed: Feb. 2, 2022

(65) Prior Publication Data
US 2022/0153521 A1  May 19, 2022

Related U.S. Application Data

(63) Continuation of application No. PCT/CN2020/101084, filed on Jul. 9, 2020.

(30) Foreign Application Priority Data

Jul. 31, 2019 (CN) .......................... 201910703461.8

(51) Int. Cl.
*B65G 1/137* (2006.01)
*B07C 3/02* (2006.01)
(Continued)

(52) U.S. Cl.
CPC .............. *B65G 1/1371* (2013.01); *B07C 3/02* (2013.01); *B07C 3/14* (2013.01); *B65G 1/0421* (2013.01);
(Continued)

(58) Field of Classification Search
CPC .. B65G 1/0492; B65G 1/1375; B65G 1/0435; B65G 1/1378; B65G 1/1373;
(Continued)

(56) References Cited

U.S. PATENT DOCUMENTS 4,492,504 A * 1/1985 Hainsworth .............. B66F 9/07
414/280
10,683,171 B2 * 6/2020 Jarvis ................... G05D 1/0234
(Continued)

FOREIGN PATENT DOCUMENTS

CN 107025533 A 8/2017
CN 108217038 A 6/2018
(Continued)

OTHER PUBLICATIONS

International Search Report for International Application PCT/CN2020/101084 mailed Oct. 13, 2020.
(Continued)

*Primary Examiner* — Timothy R Waggoner
(74) *Attorney, Agent, or Firm* — Ladas & Parry, LLP

(57) ABSTRACT

This application relates to the technical field of intelligent logistics, and discloses an intelligent sorting system and method, a warehouse robot, and a processing terminal. The system includes a warehouse robot. The warehouse robot includes a box storage unit and a handling assembly. The warehouse robot may receive a box replacement instruction, where the box replacement instruction includes information of a to-be-replaced first box, and instruct, according to the box replacement instruction, the handling assembly to replace the first box with a second box stored in the box storage unit. Therefore, box replacement is realized by a robot. In this way, the efficiency of cargo sorting is enhanced.

20 Claims, 9 Drawing Sheets

(51) Int. Cl.
    *B07C 3/14*           (2006.01)
    *B65G 1/04*           (2006.01)
    *B66F 9/06*           (2006.01)
    *B66F 9/075*          (2006.01)
    *G06V 20/50*         (2022.01)

(52) U.S. Cl.
    CPC ............ *B66F 9/063* (2013.01); *B66F 9/0755* (2013.01); *G06V 20/50* (2022.01); *B65G 2201/025* (2013.01); *B65G 2203/0216* (2013.01); *B65G 2203/041* (2013.01)

(58) Field of Classification Search
    CPC .... B65G 1/137; B65G 1/1371; B65G 1/0421; B65G 1/065; B65G 2209/06; B65G 2201/0258
    See application file for complete search history.

(56) References Cited

U.S. PATENT DOCUMENTS

| | | | |
|---|---|---|---|
| 10,954,067 B1 * | 3/2021 | Theobald | ............... B25J 19/022 |
| 11,104,516 B2 * | 8/2021 | Li | ........................ B65G 1/1373 |
| 11,161,693 B2 * | 11/2021 | Wu | ........................ B65G 1/04 |
| 11,370,107 B2 * | 6/2022 | Wu | ........................ B25J 19/02 |
| 11,427,405 B1 * | 8/2022 | Theobald | ............. B65G 1/0492 |
| 2017/0362039 A1 | 12/2017 | Eisenberg | |

FOREIGN PATENT DOCUMENTS

| | | |
|---|---|---|
| CN | 108672308 A | 10/2018 |
| CN | 108698089 A | 10/2018 |
| CN | 109675818 A | 4/2019 |
| CN | 208771894 U | 4/2019 |
| CN | 208771896 U | 4/2019 |
| CN | 110482089 A | 11/2019 |
| CN | 110516991 | 11/2019 |
| CN | 110606305 A | 12/2019 |
| CN | 210504200 U | 5/2020 |
| CN | 210794858 U | 6/2020 |
| JP | H06219511 A | 8/1994 |
| WO | 2018115608 A1 | 6/2018 |

OTHER PUBLICATIONS

Written Opinion for International Application PCT/CN2020/101084 mailed Oct. 13, 2020.

* cited by examiner

INTELLIGENT SORTING SYSTEM AND METHOD, WAREHOUSE ROBOT, AND PROCESSING TERMINAL

CROSS-REFERENCE TO RELATED APPLICATIONS

This application is a continuation under 35 U.S.C. § 120 of international patent application No. PCT/CN2020/101084 filed on Jul. 9, 2020, which claims the priority to Chinese Patent Application No. 201910703461.8 filed on Jul. 31, 2019, both of which are incorporated by reference herein in their entireties.

TECHNICAL FIELD

This application relates to the field of intelligent logistics, and in particular, to an intelligent sorting system and method, a warehouse robot, and a processing terminal.

BACKGROUND

Increasing development of artificial intelligence and online shopping brings huge development opportunities to intelligentization of warehousing, sorting, and transport of cargoes. In recent years, the technology of transporting cargoes and sorting cargoes based on warehouse robots is becoming mature. In the prior art, a warehouse robot can transport cargoes according to a predetermined route in a warehouse where the cargoes are stored. For example, the warehouse robot transports the cargoes from a shelf to a handling table. The cargoes are then correspondingly sorted manually according to orders. When boxes receiving the sorted cargoes are full, the boxes are required to be moved manually.

During the implementation of this application, the inventor discovered that manually moving the boxes in the related art affects the efficiency of cargo sorting.

SUMMARY

Embodiments of this application provide an intelligent sorting system and method, a warehouse robot, and a processing terminal. Therefore, box replacement is realized by a robot. In this way, the efficiency of cargo sorting is enhanced.

An embodiment of this application provides an intelligent sorting system. The system includes a warehouse robot. The warehouse robot includes a box storage unit and a handling assembly.

The warehouse robot is configured to: receive a box replacement instruction, where the box replacement instruction includes information of a to-be-replaced first box, and instruct, according to the box replacement instruction, the handling assembly to replace the first box with a second box stored in the box storage unit.

Optionally, the box replacement instruction further includes information of a second box storage location.

The warehouse robot is further configured to: travel to the second box storage location, and instruct the handling assembly to store the second box to the box storage unit, according to the box replacement instruction.

Optionally, the information of the first box includes a sorting port where the first box is located, and the box storage unit further includes a first box storage unit.

The warehouse robot is specifically configured to: travel to the sorting port where the first box is located, and instruct the handling assembly to move the first box to the first box storage unit and move the second box to the sorting port, according to the box replacement instruction.

Optionally, the information of the first box includes a plurality of different sorting ports where a plurality of different first boxes are located. Each first box corresponds to each sorting port. The box storage unit includes a plurality of second box storage units. Each second box storage unit stores the second box. The warehouse robot is configured to: travel to the sorting port where any first box is located, and instruct the handling assembly to handling the first box to the first box storage unit and move one of the second boxes to the sorting port, according to the box replacement instruction. The process is repeated until the second boxes stored in the plurality of second box storage units are respectively placed in the sorting ports corresponding to different first boxes.

Optionally, the warehouse robot is further configured to: after the second box is moved to the sorting port, transmit a sorting port release instruction and/or a box replacement completed instruction, to release the sorting port from a locked state.

Optionally, the box replacement instruction further includes first box identification information, the warehouse robot further includes a visual identification apparatus, the first box identification information is configured in the warehouse robot, and the warehouse robot is further configured to:

acquire identification information on the first box by using the visual identification apparatus, and determine the to-be-replaced first box depending on whether the identification information on the first box is same as the first box identification information included in the replacement instruction; and/or collect image information of the first box by using the visual identification apparatus, and perform alignment to a location of the first box according to the image information of the first box.

Optionally, the box replacement instruction further includes information of a transport destination of the first box, and the warehouse robot is further configured to:

transport the first box to the destination according to the box replacement instruction.

Optionally, the information of the destination includes a preset location of a preset shelf, and the preset location is used for placing the first box, and corresponds to a delivery destination of the first box.

Optionally, the warehouse robot is further configured to:

receive a first sorting instruction, and transport to-be-sorted cargoes and/or a container storing the to-be-sorted cargoes to a cargo sorting area according to the first sorting instruction.

Optionally, the system further includes:

a sorting robot, configured to receive a second sorting instruction, and transport a sorted cargo to the first box according to the second sorting instruction, where the sorted cargo is withdrawn from the to-be-sorted cargoes and/or the container storing the to-be-sorted cargoes.

Optionally, the second sorting instruction includes a sorted cargo receiving sub-instruction and/or a sorted cargo transport sub-instruction, and the sorting robot is specifically configured to:

receive the sorted cargo withdrawn from the to-be-sorted cargoes and/or the container storing the to-be-sorted cargoes according to the sorted cargo receiving sub-instruction; and/or transport the sorted cargo to the first box according to the sorted cargo transport sub-instruction.

Optionally, the system further includes a processing terminal. The processing terminal is configured to: transmit the box replacement instruction, where the box replacement instruction includes information of a to-be-replaced first box, and instruct, according to the box replacement instruction, the warehouse robot to replace the first box with the second box.

Optionally, the processing terminal is further configured to:
transmit a first sorting instruction, to cause the warehouse robot to transport to-be-sorted cargoes and/or a container storing the to-be-sorted cargoes to a cargo sorting area.

Optionally, the processing terminal is further configured to:
transmit a second sorting instruction, to cause the sorting robot to transport a sorted cargo to the first box according to the second sorting instruction, where the sorted cargo is withdrawn from the to-be-sorted cargoes and/or the container storing the to-be-sorted cargoes.

Optionally, the second sorting instruction includes a sorted cargo receiving sub-instruction and a sorted cargo transport sub-instruction, and the processing terminal is specifically configured to:
receive the sorted cargo withdrawn from the to-be-sorted cargoes and/or the container storing the to-be-sorted cargoes according to the sorted cargo receiving sub-instruction, and
transport the sorted cargo to the first box according to the sorted cargo transport sub-instruction.

An embodiment of this application provides an intelligent sorting method. The method is applicable to a warehouse robot. The warehouse robot includes a box storage unit and a handling assembly. The method includes:
receiving a box replacement instruction, where the box replacement instruction includes information of a to-be-replaced first box; and
instructing, according to the box replacement instruction, the handling assembly to replace the first box with a second box stored in the box storage unit.

Optionally, the box replacement instruction further includes information of a second box storage location. The method further includes:
travelling to the second box storage location, and instructing the handling assembly to store the second box to the box storage unit, according to the box replacement instruction.

Optionally, the first box information includes a sorting port where the first box is located, and the sorting port is in a locked state. The box storage unit further includes a first box storage unit, and the instructing, according to the box replacement instruction, the handling assembly to replace the first box with a second box stored in the box storage unit includes:
travelling, according to the box replacement instruction, to the sorting port where the first box is located; and
instructing the handling assembly to move the first box to the first box storage unit and move the second box to the sorting port.

Optionally, the information of the first box includes a plurality of different sorting ports where a plurality of different first boxes are located. Each first box corresponds to each sorting port. The box storage unit includes a plurality of second box storage units, and each second box storage unit stores the second box.

The instructing, according to the box replacement instruction, the handling assembly to replace the first box with a second box stored in the box storage unit includes: travelling to the sorting port where any first box is located, and instruct the handling assembly to move the first box to the first box storage unit and moving one of the second boxes to the sorting port, according to the box replacement instruction, where the process is repeated until the second boxes stored in the plurality of second box storage units are respectively placed in the sorting ports corresponding to different first boxes.

Optionally, after the moving the second box to the sorting port, the method further includes:
transmitting a sorting port release instruction and/or a box replacement completed instruction, to release the sorting port from the locked state.

Optionally, the box replacement instruction further includes information of a transport destination of the first box, and the method further includes:
transport the first box to the destination according to the box replacement instruction.

Optionally, the information of the destination includes a preset location of a preset shelf, and the preset location is used for placing the first box, and corresponds to a delivery destination of the first box.

An embodiment of this application provides an intelligent sorting method. The method is applicable to a processing terminal and includes:
transmitting a box replacement instruction, where the box replacement instruction includes information of a to-be-replaced first box; and
instructing, according to the box replacement instruction, a warehouse robot to replace the first box with a second box.

Optionally, the box replacement instruction further includes information of a second box storage location.

The method further includes:
instructing, according to the box replacement instruction, the warehouse robot to travel to the second box storage location, to cause the warehouse robot to store the second box to a box storage unit of the warehouse robot.

Optionally, the first box information includes a sorting port where the first box is located.

The instructing, according to the box replacement instruction, a warehouse robot to replace the first box with a second box includes:
locking, according to the box replacement instruction, the sorting port where the first box is located; and
instructing the warehouse robot to move the first box to a first box storage unit of the warehouse robot and move the second box to the sorting port.

Optionally, the method further includes:
receiving a sorting port release instruction and/or a box replacement completed instruction, to release the sorting port.

Optionally, the box replacement instruction further includes information of a transport destination of the first box, and the method further includes:
instructing, according to the box replacement instruction, the warehouse robot to transport the first box to the destination.

Optionally, the method further includes:
transmitting a first sorting instruction, to cause the warehouse robot to transport to-be-sorted cargoes and/or a container storing the to-be-sorted cargoes to a cargo sorting area.

Optionally, the method further includes:

transmitting a second sorting instruction, to cause the sorting robot to transport a sorted cargo to the first box according to the second sorting instruction, where the sorted cargo is withdrawn from the to-be-sorted cargoes and/or the container storing the to-be-sorted cargoes.

Optionally, the second sorting instruction includes a sorted cargo receiving sub-instruction and/or a sorted cargo transport sub-instruction, and the transporting a sorted cargo to the first box according to the second sorting instruction includes:

receiving the sorted cargo withdrawn from the to-be-sorted cargoes and/or the container storing the to-be-sorted cargoes according to the sorted cargo receiving sub-instruction; and/or transporting the sorted cargo to the first box according to the sorted cargo transport sub-instruction.

An embodiment of this application provides a warehouse robot. The warehouse robot includes:

at least one processor; and a memory, communicatively connected to the at least one processor.

The memory stores instructions executable by the at least one processor. The instructions, when executed by the at least one processor, cause the at least one processor to perform the above intelligent sorting method applicable to the warehouse robot.

An embodiment of this application provides a processing terminal. The processing terminal includes:

at least one processor; and a memory, communicatively connected to the at least one processor.

The memory stores instructions executable by the at least one processor. The instructions, when executed by the at least one processor, cause the at least one processor to perform the above intelligent sorting method applicable to the processing terminal.

An embodiment of this application provides a non-transient computer-readable storage medium. The non-transient computer-readable storage medium stores computer-executable instructions. The computer-executable instructions cause a computer to perform the above intelligent sorting method.

An embodiment of this application further provides a computer program product. The computer program product includes a computer program stored in a non-transient computer-readable storage medium. The computer program includes program instructions. The program instructions, when executed by a computer, cause the computer to perform the above intelligent sorting method.

The intelligent sorting system provided in the embodiments of this application includes a warehouse robot. The warehouse robot includes a box storage unit and a handling assembly. The warehouse robot may receive a box replacement instruction, where the box replacement instruction includes information of a to-be-replaced first box, and instruct, according to the box replacement instruction, the handling assembly to replace the first box with a second box stored in the box storage unit. Therefore, box replacement is realized by a robot. In this way, the efficiency of cargo sorting is enhanced.

BRIEF DESCRIPTION OF THE DRAWINGS

One or more embodiments are exemplarily described with reference to the corresponding figures in the accompanying drawings, and the descriptions are not to be construed as limiting the embodiments. Components in the accompanying drawings that have same reference numerals are represented as similar components, and unless otherwise particularly stated, the figures in the accompanying drawings are not drawn to scale.

DETAILED DESCRIPTION

To make the objectives, technical solutions, and advantages of this application clearer, the following further describes this application in detail with reference to the accompanying drawings and the embodiments. It is to be understood that the specific embodiments described herein are merely used to describe this application, instead of limiting this application.

Unless otherwise defined, all technical and scientific terms used herein have the same meaning as commonly understood by one of ordinary skill in the art to which this application belongs. The terms used in the specification of this application are merely used for describing specific embodiment methods, and are not intended to limit this application. The term "and/or" used in this specification includes any and all combinations of one or more of the associated listed items, and the terms "first, second, third," etc. used in this specification do not mean that there is a specific sequence relationship or degree of importance among them, and persons skilled in the art should understand that the terms are for the convenience of expression.

An intelligent cargo sorting system provided herein is applicable to any suitable industry field or technical field, such as the field of intelligent warehousing or the field of intelligent logistics. In the embodiments of this application, a system that is applicable to the field of intelligent warehousing and can intelligently sort cargoes according to cargo orders is used as an example for description.

Figure 1:
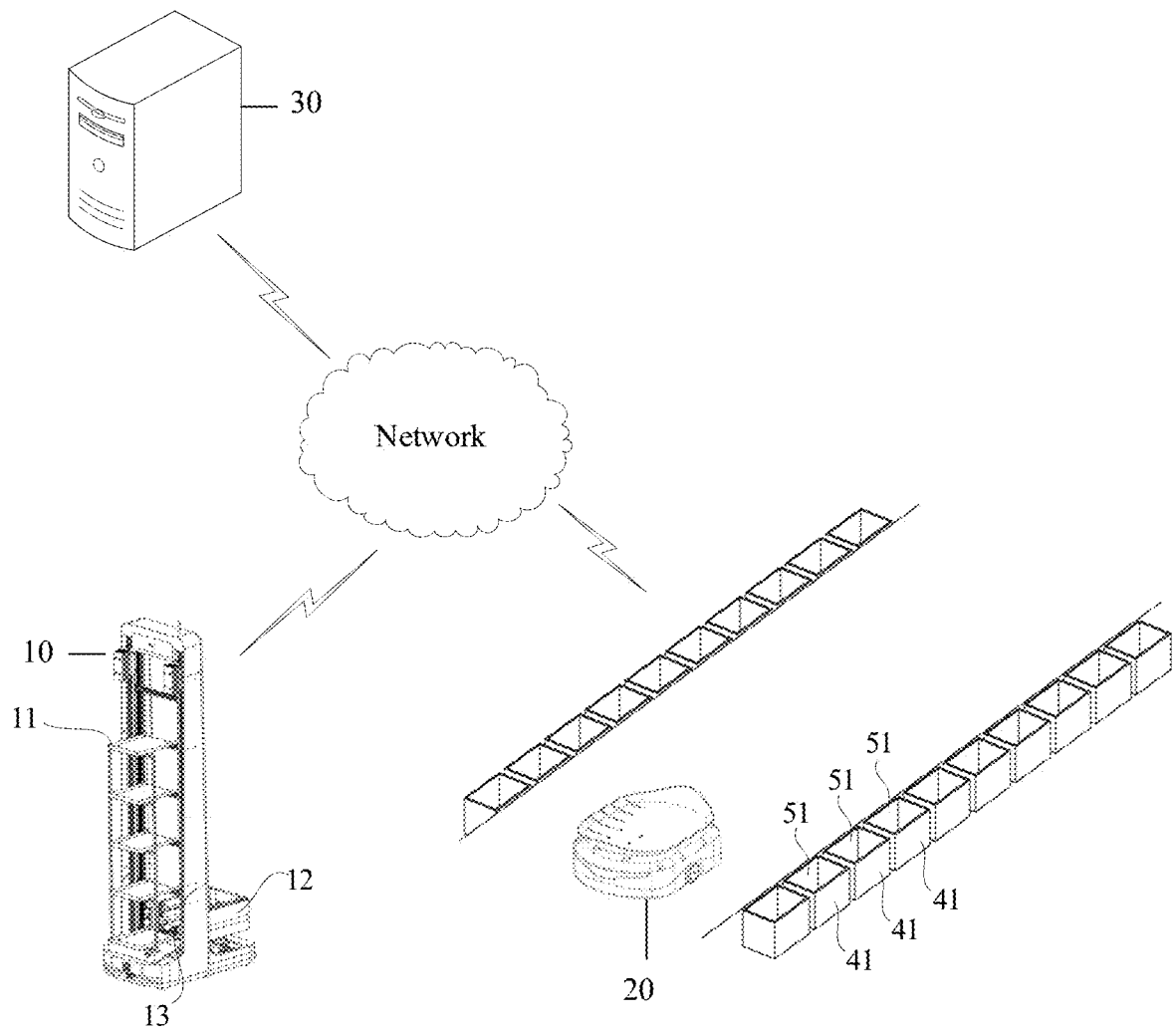
FIG. 1 is a schematic composition diagram of an intelligent sorting system according to an embodiment of this application.
Figure 7:
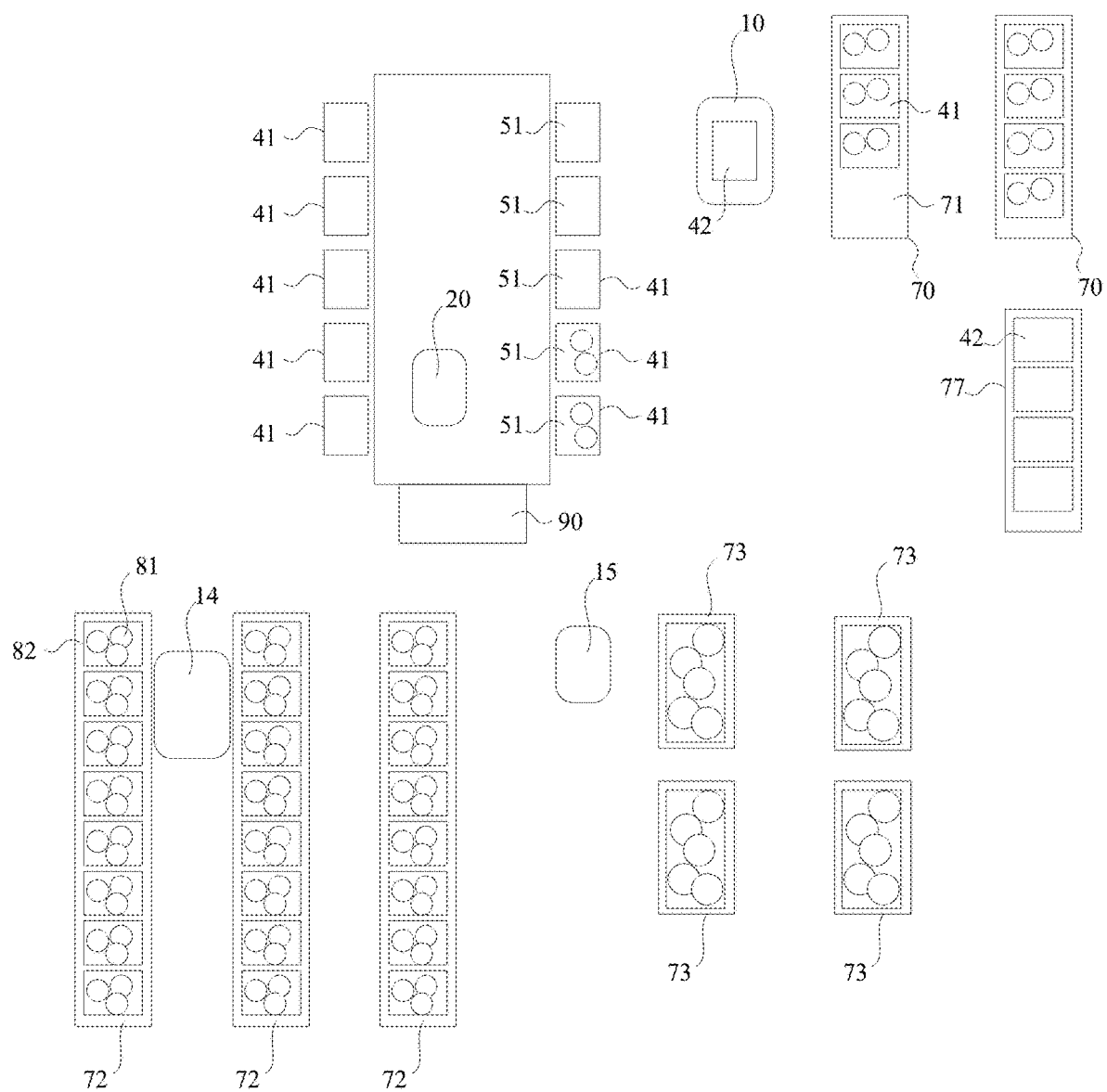
FIG. 7 is a schematic composition diagram of an intelligent sorting system according to an embodiment of this application.

FIG. 1 is a schematic composition diagram of an intelligent sorting system according to an embodiment of this application. Referring to FIG. 1 and FIG. 7, the intelligent cargo sorting system 100 includes a warehouse robot 10. The warehouse robot 10 includes a box storage unit 11 and a handling assembly 12. The warehouse robot 10 may be connected to a processing terminal 30 by using a network. The network may be either a wired network or a wireless network. The warehouse robot 10 may receive a box replacement instruction, where the box replacement instruction includes information of a to-be-replaced first box 41, and instruct, according to the box replacement instruction, the handling assembly 12 to replace the first box 41 with a second box 42 stored in the box storage unit 11. In this embodiment of this application, the first box 41 may be a box configured to receive sorted cargoes. When the box is full of the received cargoes or overweight or sorting of the cargoes is completed and it is determined that the box is required to be replaced, the first box 41 may be referred to as a target box. The second box 42 is an empty box for replacing the first box 41. Generally, it may be understood that, after the first box 41 is full, the first box 41 needs to be replaced with a new empty box for further sorting of the cargoes.

In this embodiment of this application, the box replacement instruction may be transmitted to the warehouse robot 10 by the processing terminal 30. The processing terminal 30 may transmit the box replacement instruction when the box is full or overweight or the sorting of the cargoes is completed. Definitely, the box replacement instruction may be transmitted when the box is required to be replaced. It may be determined by using a sensor whether the box is full or overweight. A sensing signal, such as a full signal or an overweight signal is sent to indicate a corresponding state and is reported to the processing terminal 30. The processing terminal 30 may trigger the box replacement instruction after receiving the corresponding signal. In order to determine a specific box that is full or overweight, and when the box needs to be replaced, the box replacement instruction may include information of a first box 41 required to be replaced. The information of the first box 41 may include location information of the first box, for example, a sorting port 51 where the first box 41 is located. Therefore, the warehouse robot can find the to-be-replaced first box 41 according to the location information. In addition, the sorting port of the first box 41 may be locked to stop sorting of the cargoes into the first box 41. The first box information may further include first box identification information. The identification information may be used for determining whether the first box identification information included in the replacement instruction is same as the identification information on the first box 41, to determine the first box 41 required to be replaced, and/or alignment may be performed to a position of the first box 41 according to the identification information. In addition, alignment to the position of the first box 41 may alternatively be realized by visual identification. The warehouse robot 10 may include a visual identification apparatus 13, such as a camera. Image information of the first box 41 is collected by using the camera, and alignment to the first box 41 is performed according to the image information. The image information may be an image frame in a recorded video. The position of the first box 41 is determined according to changes in the image frame during the movement of the warehouse robot 10.

In this embodiment of this application, the box replacement instruction further includes information of a second box storage location 77. The warehouse robot 10 is further configured to: travel to the second box storage location 77, and instruct the handling assembly 12 to store the second box 42 to the box storage unit, according to the box replacement instruction. The second box storage location 77 may be a designated place where the second box 42 is stored. The warehouse robot 10 may travel to the place, and the handling assembly 12 grabs the second box 42 and places the second box 42 to the box storage unit. In some embodiments, the box storage unit 11 may include a plurality of box storage units 11. In the process, the warehouse robot 10 may grab and place one second box 42 to a corresponding box storage unit 11 each time from the second box storage place, and may grab the second box 42 according to a quantity of first boxes 41 actually required to be replaced. In this way, the efficiency of replacing boxes is enhanced.

Figure 8:
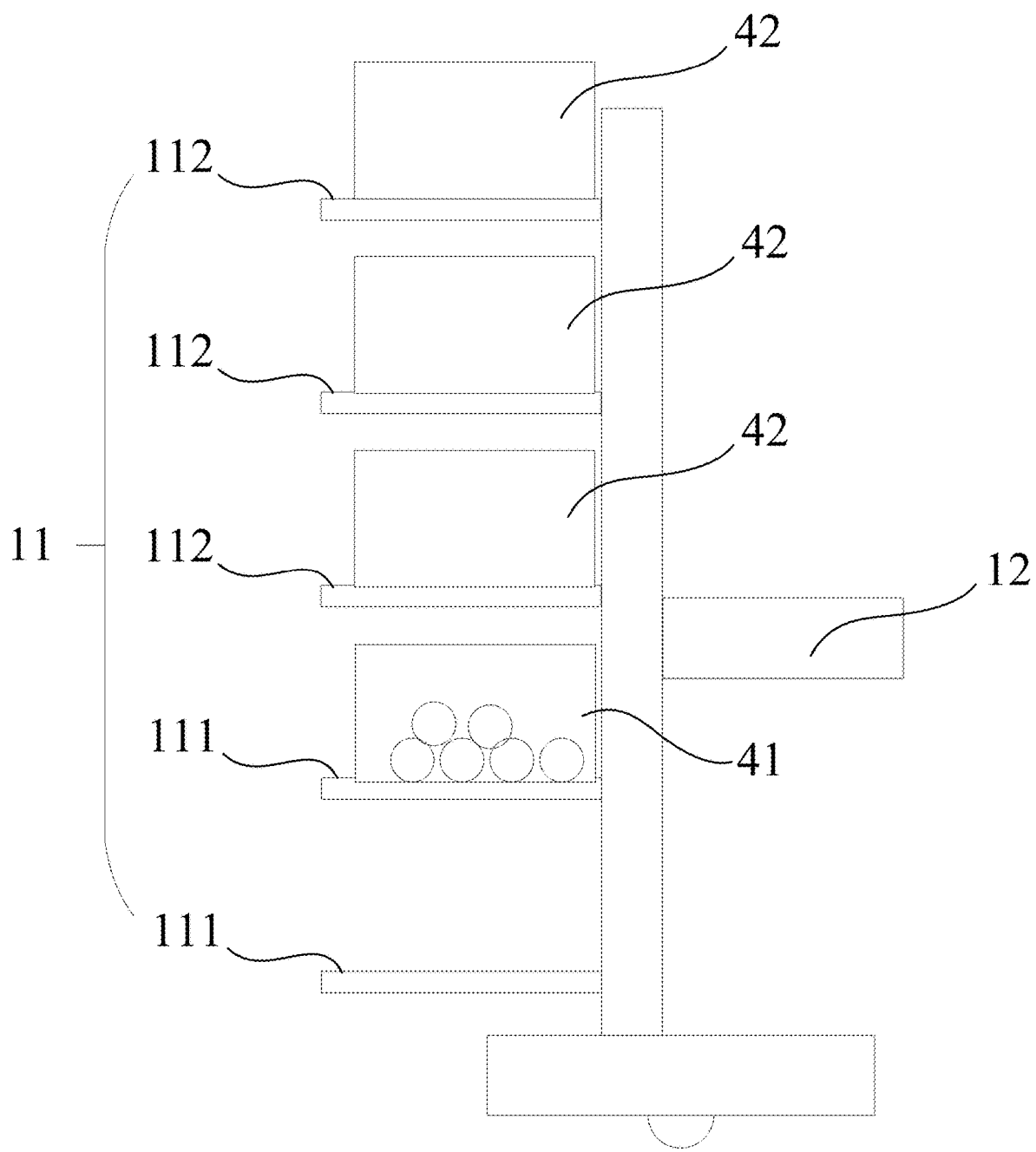
FIG. 8 is a schematic diagram of a warehouse robot according to an embodiment of this application.

In this embodiment of this application, the box storage unit 11 of the warehouse robot 10 may be configured to place the second box 42 or the first box 41. As shown in FIG. 8, the box storage unit 11 may be referred to as a first box storage unit 111 when being configured to place the first box. The first box storage unit 111 is required to be empty before the warehouse robot 10 replaces the first box 41. Therefore, the warehouse robot 10 instructs the handling assembly 12 to move the first box 41 to the first box storage unit 111.

In this embodiment of this application, the information of the first box 41 includes a sorting port 51 where the first box 41 is located. The sorting port 51 is in a locked state. The box storage unit 11 further includes the first box storage unit 111. The warehouse robot 10 is specifically configured to: travel to the sorting port 51 where the first box 41 is located, and instruct the handling assembly 12 to move the first box 41 to the first box storage unit 111 and move the second box 42 to the sorting port 51, according to the box replacement instruction. When a plurality of first boxes 41 are required to be replaced, the warehouse robot 10 may travel to the sorting port 51 of each first box 41, complete the moving of the first box 41 to the first box storage unit 111 at the sorting port 51, move the second box 42 to the sorting port 51, and then travel to a next sorting port 51.

In this embodiment of this application, a plurality of first boxes 41 may be required to be replaced. The plurality of boxes are located at different sorting ports 51. Each first box 41 corresponds to one sorting port 51. In order to reduce times the warehouse robot 10 replaces the first boxes 41, the warehouse robot 10 may include a plurality of box storage units 11. The plurality of box storage units 11 may include an empty box storage unit. The empty box storage unit is configured to store the removed first box 41, and may be referred to as the first box storage unit 111. The rest of the box storage units 11 are configured to store the second boxes 42. The second boxes 42 are empty boxes, and are configured to replace the first boxes 41 loaded with cargoes, that is, target boxes. When replacing the first boxes 41, the warehouse robot 10 may travel, according to the box replacement instruction, to the sorting port 51 where any first box 41 (which may be referred to as a first box #1) is located. The handling assembly 12 is instructed to move the first box #1 to the first box storage unit 111 (which may be referred to as a first box storage unit #1), and to move any second box 42 (which may be referred to as a second box #1) to the sorting port 51 corresponding to the first box #1. A second box storage unit 112 where the second box #1 is located is updated to the first box storage unit 111 (which may be referred to as a first box storage unit #2). When the second first box, that is, a first box #2 is to be replaced, the first box #2 may be placed to the first box storage unit #2, and a second box #2 may be placed to the sorting port 51 where the first box #2 is located. The process is repeated until the second boxes 42 stored in a plurality of second box storage units 112 are respectively placed in the sorting ports 51 corresponding to different first boxes 41. After all of the second boxes 42 of all of the second box storage units 112 are placed into different sorting ports 51, all of the removed first boxes 41 are transported to a destination.

In this embodiment of this application, the warehouse robot 10 is further configured to: after the second box 42 is moved to the sorting port 51, transmit a sorting port release instruction and/or a box replacement completed instruction, to release the sorting port 51. During the replacement of the box, the sorting port 51 is in a locked state. When replacement of the box is completed, that is, after the second box 42 is moved to the sorting port 51, the cargoes are sorted into the second box 42 to continue the sorting of the cargoes. The warehouse robot 10 may transmit the sorting port release instruction and/or the box replacement completed instruction, to release the sorting port 51 replaced with the second box 42, that is, to release the locked state of the sorting port 51. Before the replacement instruction is transmitted, the sorting port 51 where the first box 41 required to be replaced is located may be locked. After the first box 41 is replaced, the locked sorting port 51 may be released. When the sorting port 51 is in the locked state, cargoes are no longer sorted into the sorting port 51. In this case, the locked sorting port 51 cannot be used as a movement destination of the sorting robot 20, that is, cargoes can no longer be sorted into the sorting port 51. After the first box 41 is replaced with the second box 42, the locked state of the corresponding sorting port 51 can be released. Therefore, cargoes can be sorted into the unlocked sorting port 51 again.

In this embodiment of this application, the box replacement instruction further includes information of a transport destination of the first box 41. The warehouse robot is further configured to: transport the first box 41 to the destination according to the box replacement instruction. The destination may include a delivery and temporary storage location or a delivery and casing location of the first box 41. The delivery location or the delivery and casing location may be on a preset location 71 of a preset shelf 70. The preset location 71 is used for placing the first box 41 and corresponds to a delivery destination of the first box 41. The preset shelf 70 may be a corton flow. A preset correspondence exists between the delivery and temporary storage location or the delivery and casing location of the first box 41 and the first box 41, so that a receiving address of the cargoes in the first box 41 can be determined according to cargo order information. Different receiving addresses correspond to corresponding delivery areas or delivery locations. Therefore, the boxes loaded with the cargoes can be transported to the delivery area by using the warehouse robot 10. In this way, manpower investment is further reduced, and the intellectualization degree of cargo logistics is increased.

In this embodiment of this application, the warehouse robot 10 is further configured to: receive a first sorting instruction, and transport to-be-sorted cargoes 81 and/or a container 82 storing the to-be-sorted cargoes 81 to a cargo sorting area 90 according to the first sorting instruction. The cargo sorting area 90 is located in an area of a supplied cargo handling table and/or a mechanical arm. During the sorting of the cargoes, the to-be-sorted cargoes 81 are required to be transported to the area of the handling table or the mechanical arm, to sort the cargo by using the handling table or the mechanical arm.

Figure 9:
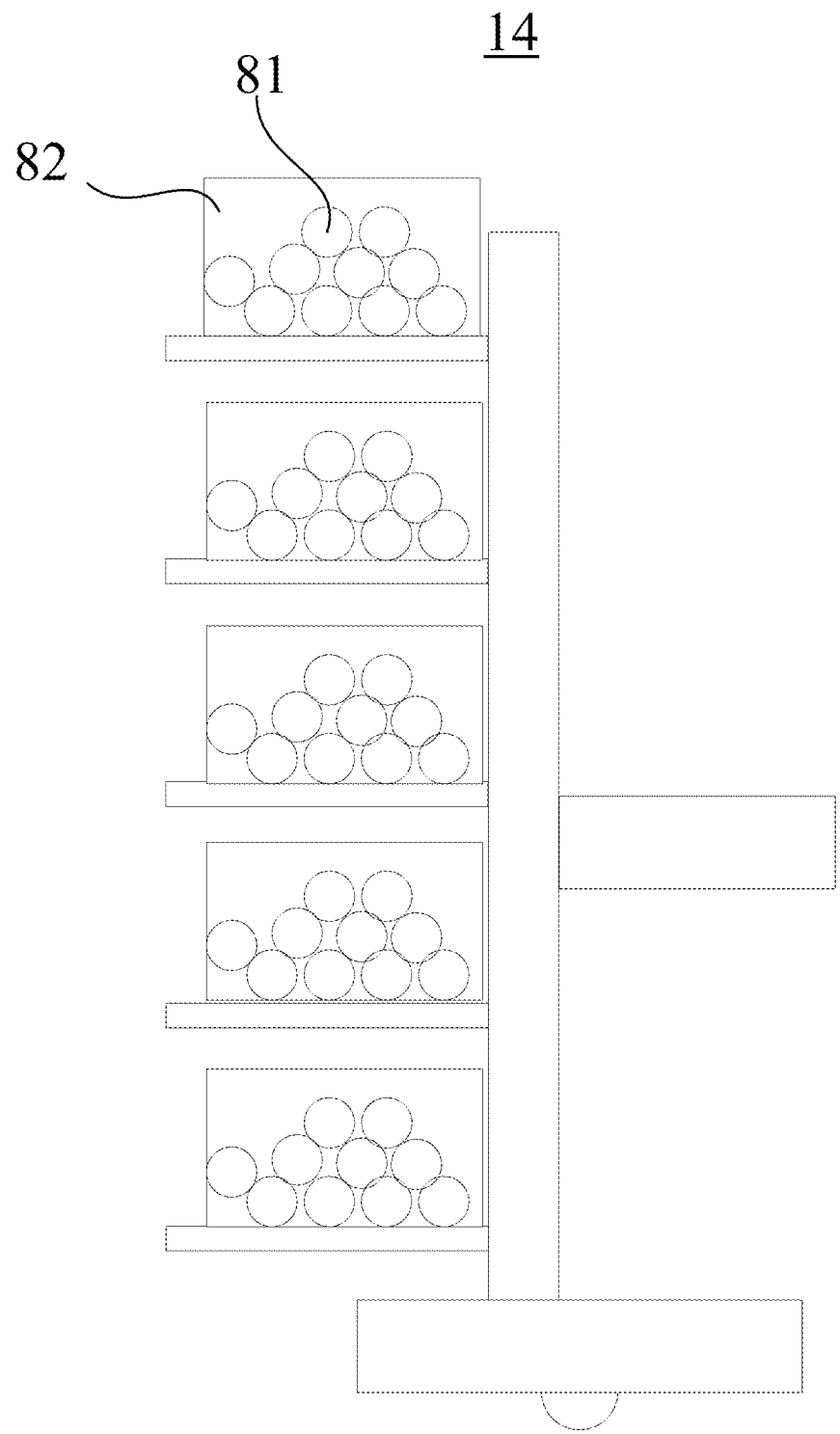
FIG. 9 is a schematic diagram of a first warehouse robot according to an embodiment of this application, showing the first warehouse robot is transporting a container storing to-be-sorted cargoes.
Figure 10:
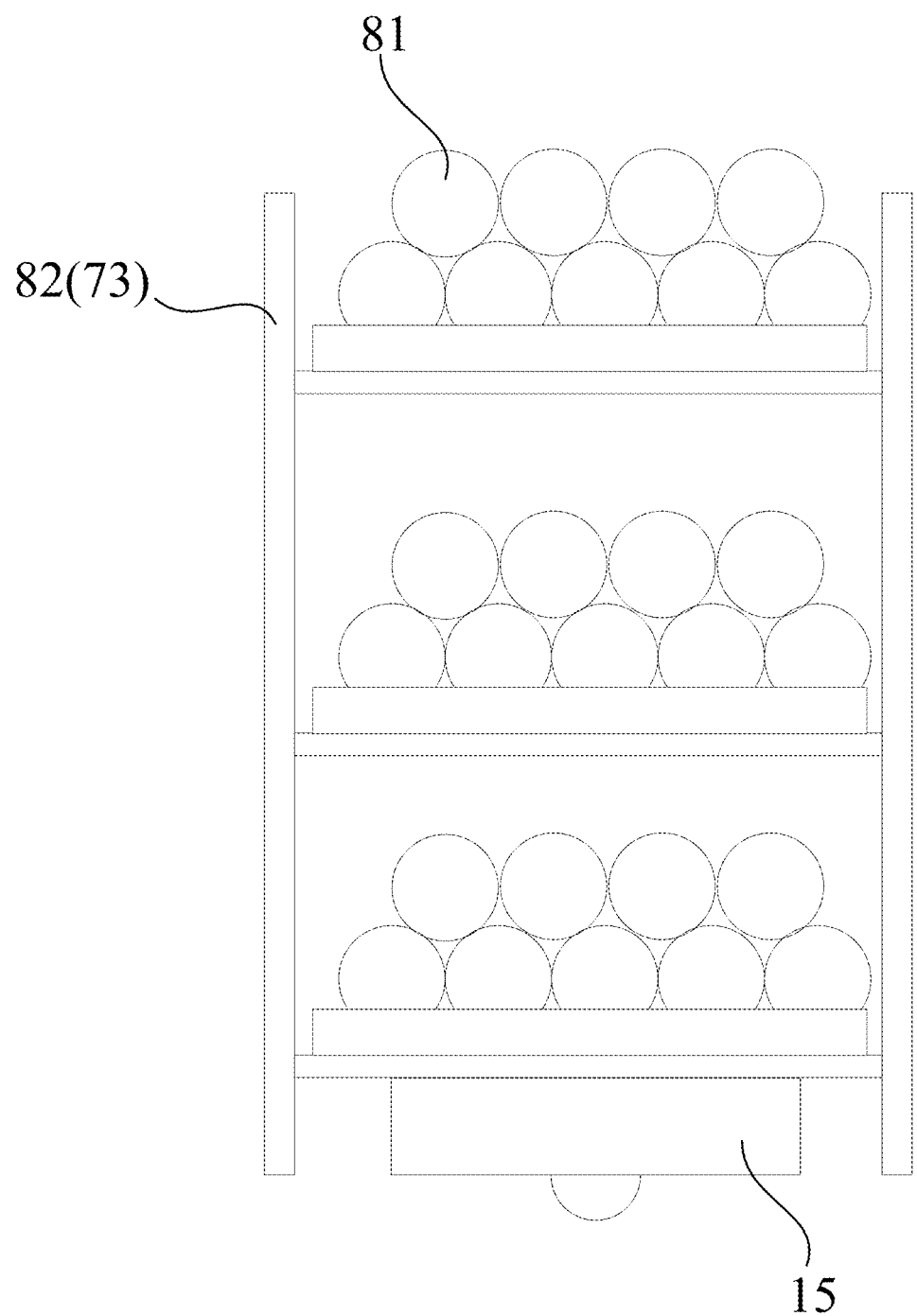
FIG. 10 is a schematic diagram of a second warehouse robot according to an embodiment of this application, showing the second warehouse robot is transporting a movable shelf.

In this embodiment of this application, the system further includes a fixed shelf 72 and/or a movable shelf 73. The container 82 includes the movable shelf 73, a case located on the fixed shelf 72 and/or a case located on the movable shelf 73. The warehouse robot 10 includes a first warehouse robot 14 and/or a second warehouse robot 15, as shown in FIG. 9 and FIG. 10.

The transporting to-be-sorted cargoes 81 and/or a container 82 storing the to-be-sorted cargoes to a cargo sorting area according to the first sorting instruction includes:

moving, by the first warehouse robot 14, the to-be-sorted cargoes 81 from the fixed shelf 71 to the cargo sorting area 90 according to the first sorting instruction, and/or moving, by the first warehouse robot 14, the cargo box storing the to-be-sorted cargoes 81 from the fixed shelf 71 to the cargo sorting area 90, according to the first sorting instruction, and/or moving, by the second warehouse robot 15, the movable shelf 73 storing the to-be-sorted cargoes 81 to the cargo sorting area 90 according to the first sorting instruction, and/or moving, by the second warehouse robot 15 according to the first sorting instruction, the movable shelf 73 storing the box storing the to-be-sorted cargoes 81 to the cargo sorting area 90.

In this embodiment of this application, the system further includes a sorting robot 20. The sorting robot 20 may be configured to configured to receive a second sorting instruction, and transport a sorted cargo to the first box 41 according to the second sorting instruction, where the sorted cargo is withdrawn from the to-be-sorted cargoes 81 and/or the container 82 storing the to-be-sorted cargoes 81.

In this embodiment of this application, the second sorting instruction includes a sorted cargo receiving sub-instruction. The sorting robot 20 is configured to: receive the sorted cargo receiving sub-instruction, and receive the sorted cargo withdrawn from the to-be-sorted cargoes 81 and/or the container 82 storing the to-be-sorted cargoes 81 according to the sorted cargo receiving sub-instruction.

In this embodiment of this application, the sorted cargo receiving sub-instruction may be received after the sorting robot 20 transports the sorted cargo to the sorting port 51. After receiving the sorted cargo receiving sub-instruction, the sorting robot 20 travels to the cargo sorting area 90, such as the supplied cargo handling table or the mechanical arm area from the sorting port 51, so as to receive the sorted cargo withdrawn from the to-be-sorted cargoes 81 by the cargo supplied cargo handling table or the mechanical arm.

In this embodiment of this application, the second sorting instruction further includes a sorted cargo transport sub-instruction. The sorting robot 20 is configured to: receive the sorted cargo transport sub-instruction, and transport the sorted cargo to the first box 41 according to the sorted cargo transport sub-instruction.

In this embodiment of this application, the sorted cargo transport sub-instruction may be received after the sorting robot 20 receives the sorted cargo. After receiving the sorted cargo transport sub-instruction, the sorting robot 20 transports the sorted cargo from a position where the sorted cargo is received to the position of the first box 41, that is, the sorting port 51 where the first box 41 is located.

In this embodiment of this application, the processing terminal 30 is configured to: transmit the box replacement instruction, where the box replacement instruction includes information of a to-be-replaced first box 41, and instruct, according to the box replacement instruction, the warehouse robot 10 to replace the first box 41 with the second box 42.

In this embodiment of this application, the processing terminal 30 is further configured to:

transmit a first sorting instruction, to cause the warehouse robot 10 to transport to-be-sorted cargoes 81 and/or a container 82 storing the to-be-sorted cargoes to a cargo sorting area 90.

In this embodiment of this application, the processing terminal 30 is further configured to:

transmit a second sorting instruction, to cause the sorting robot 20 to transport a sorted cargo to the first box 41 according to the second sorting instruction, where the sorted cargo is withdrawn from the to-be-sorted cargoes 81 and/or the container 82 storing the to-be-sorted cargoes 81. The second sorting instruction includes a sorted cargo receiving sub-instruction and a sorted cargo transport sub-instruction.

In this embodiment of this application, the box replacement instruction may be various box replacement instructions received by the above warehouse robot 10. For example, the box replacement instruction includes information of the second box storage location 77, the sorting port 51 where the first box 41 is located, the first box identification information, and/or the information of the transport destination of the first box 41. The warehouse robot 10 is instructed according to corresponding information to perform corresponding processing. The first sorting instruction may be the first sorting instruction received by the warehouse robot 10. The second sorting instruction may be various second sorting instructions received by the above sorting robot 20. In this way, the warehouse robot 10 is instructed to move the to-be-sorted cargoes 81 according to the first sorting instruction, and the sorting robot 20 is instructed to sort the cargoes according to the second sorting instruction.

The intelligent sorting system provided in the embodiments of this application includes a warehouse robot 10. The warehouse robot 10 includes a box storage unit 11 and a handling assembly 12. The warehouse robot 10 may receive a box replacement instruction, where the box replacement instruction includes information of a to-be-replaced first box 41, and instruct, according to the box replacement instruction, the handling assembly 12 to replace the first box 4 with a second box 42 stored in the box storage unit 11. Therefore, box replacement is realized by a robot. In this way, the efficiency of cargo sorting is enhanced.

Figure 2:
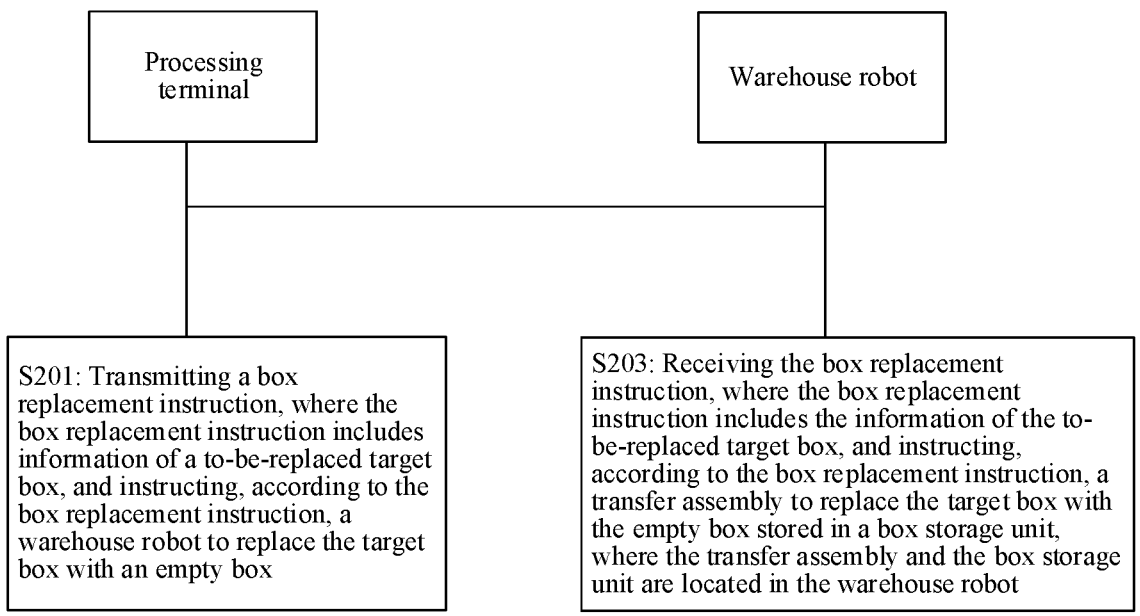
FIG. 2 is a schematic flowchart of an intelligent sorting method according to an embodiment of this application.

FIG. 2 is a schematic flowchart of an intelligent sorting method according to an embodiment of this application. The method is applicable to the warehouse robot and the processing terminal in the above embodiment of the intelligent sorting system. As shown in FIG. 2, the method includes the following steps.

S201: Transmitting a box replacement instruction, where the box replacement instruction includes information of a to-be-replaced first box, and instructing, according to the box replacement instruction, a warehouse robot to replace the first box with a second box.

In this embodiment of this application, the step may be performed by the processing terminal.

When the information of the first box includes a sorting port where the first box is located, the instructing, according to the box replacement instruction, a warehouse robot to replace the first box with a second box includes:

locking, according to the box replacement instruction, the sorting port where the first box is located; and instructing the warehouse robot to move the first box to a first box storage unit of the warehouse robot and move the second box to the sorting port.

In this embodiment of this application, the processing terminal may further perform the following step:

instructing, according to the box replacement instruction, the warehouse robot to travel to a second box storage location 77, to cause the warehouse robot to place the second box to a box storage unit of the warehouse robot, where the box replacement instruction further includes information of the second box storage location 77.

In this embodiment of this application, the processing terminal may further perform the following step:

receiving a sorting port release instruction and/or a box replacement completed instruction, to release the sorting port; and/or instructing, according to the box replacement instruction, the warehouse robot to transport the first box to a destination, where the box replacement instruction further includes information of the transport destination of the first box.

S203: Receiving the box replacement instruction, where the box replacement instruction includes the information of the to-be-replaced first box, and instructing, according to the box replacement instruction, a handling assembly to replace the first box with the second box stored in a box storage unit, where the handling assembly and the box storage unit are located in the warehouse robot.

In this embodiment of this application, the step may be performed by the warehouse robot.

When the first box information includes the sorting port where the first box is located, the sorting port is in a locked state, and the box storage unit further includes the first box storage unit, the indicating, according to the box replacement instruction, a handling assembly to replace the first box with the second box stored in a box storage unit includes:

travelling, according to the box replacement instruction, to the sorting port where the first box is located; and instructing the handling assembly to move the first box to the first box storage unit and move the second box to the sorting port.

In this embodiment of this application, the warehouse robot may further perform the following steps:

travelling to the second box storage location 77, and instructing the handling assembly to store the second box to the box storage unit, according to the box replacement instruction, where the box replacement instruction further includes the information of the second box storage location 77.

In this embodiment of this application, the warehouse robot may further perform the following steps: after the second box is moved to the sorting port, transmitting a sorting port release instruction and/or a box replacement completed instruction, to release the sorting port; and/or transporting, according to the box replacement instruction, the first box to the destination, where the box replacement instruction further includes the information of the transport destination of the first box.

It is to be noted that, steps in the above various steps performed by a same execution subject such as the warehouse robot or the processing terminal may constitute a different embodiment of this application alone or in combination. Those of ordinary skill in the art may understand different protection scope supported by the different embodiments.

Since the above embodiment of the intelligent sorting method and the above embodiment of the intelligent sorting system are based on the same inventive concept, the corresponding contents and beneficial effects of the above embodiment of the intelligent sorting system are applicable to the intelligent sorting method embodiment, and therefore details are not described in detail herein again.

Figure 3:
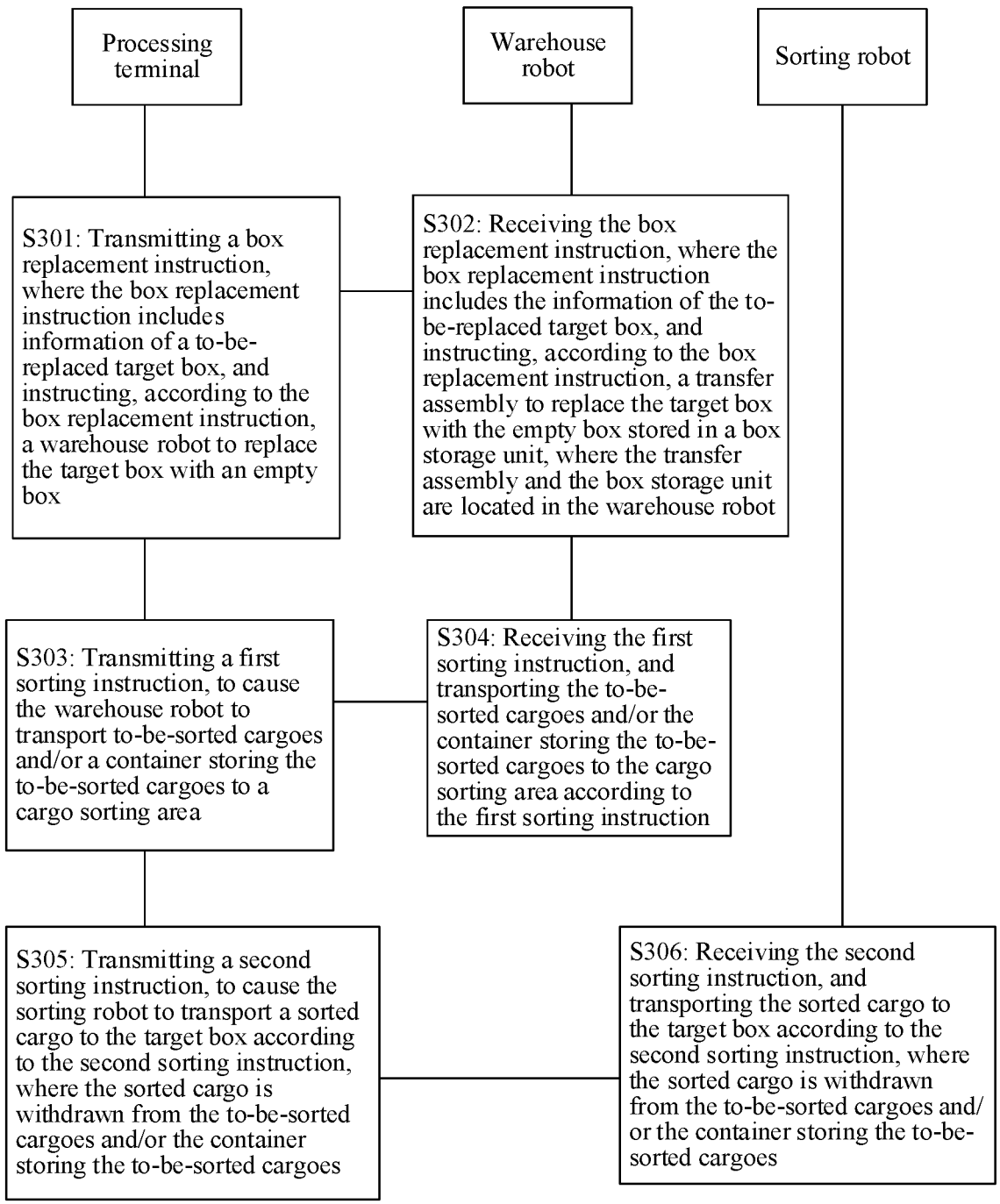
FIG. 3 is a schematic flowchart of another intelligent sorting method according to an embodiment of this application.

FIG. 3 is a schematic flowchart of another intelligent sorting method according to an embodiment of this application. The method is applicable to the warehouse robot, the sorting robot, and the processing terminal in the above embodiment of the intelligent sorting system. As shown in FIG. 3, the method includes the following steps:

S301: Transmitting a box replacement instruction, where the box replacement instruction includes information of a to-be-replaced first box, and instructing, according to the box replacement instruction, a warehouse robot to replace the first box with a second box.

The step is performed by the processing terminal. In addition, the processing terminal may further process other steps related to the box replacement instruction. Since the step and other steps are same as step S201 and other steps performed by the processing terminal in the above embodiment of the intelligent sorting method, details are not described herein again.

S302: Receiving the box replacement instruction, where the box replacement instruction includes the information of the to-be-replaced first box, and instructing, according to the box replacement instruction, a handling assembly to replace the first box with the second box stored in a box storage unit, where the handling assembly and the box storage unit are located in the warehouse robot.

In this embodiment of this application, the step may be performed by the warehouse robot. In addition, the warehouse robot may further process other steps related to the box replacement instruction. Since the step and other steps are same as step S203 and other steps performed by the warehouse robot in the above embodiment of the intelligent sorting method, details are not described herein again.

S303: Transmitting a first sorting instruction, to cause the warehouse robot to transport to-be-sorted cargoes and/or a container storing the to-be-sorted cargoes to a cargo sorting area.

In this embodiment of this application, the step may be performed by the processing terminal. In addition, the processing terminal may further perform the following steps:
  determining a quantity of the to-be-sorted cargoes according to a cargo quantity required in an order; and
  determining types of the to-be-sorted cargoes according to cargo type information in the order.

In this embodiment of this application, the processing terminal may further perform the following step: transmitting the first sorting instruction according to inventory information, received order information, and dynamic information of the warehouse robot.

S304: Receiving the first sorting instruction, and transporting the to-be-sorted cargoes and/or the container storing the to-be-sorted cargoes to the cargo sorting area according to the first sorting instruction.

In this embodiment of this application, the step may be performed by the warehouse robot. In addition, the warehouse robot may further perform the following step: transporting the to-be-sorted cargoes and/or the container storing the to-be-sorted cargoes to the cargo sorting area according to the first sorting instruction, including:
  moving, by a first warehouse robot, the to-be-sorted cargoes from a fixed shelf to the cargo sorting area according to the first sorting instruction, and/or
  moving, by the first warehouse robot, the cargo box storing the to-be-sorted cargoes from the fixed shelf to the cargo sorting area, according to the first sorting instruction, and/or
  moving, by a second warehouse robot, a movable shelf storing the to-be-sorted cargoes to the cargo sorting area according to the first sorting instruction, and/or
  moving, by the second warehouse robot according to the first sorting instruction, the movable shelf storing the box storing the to-be-sorted cargoes to the cargo sorting area.

The container includes the movable shelf, a case located on the fixed shelf and/or a case located on the movable shelf. The warehouse robot includes the first warehouse robot and/or the second warehouse robot.

A quantity of the to-be-sorted cargoes is determined according to a cargo quantity required in an order, and is not less than the quantity of the cargoes required in the order.

S305: Transmitting a second sorting instruction, to cause the sorting robot to transport a sorted cargo to the first box according to the second sorting instruction, where the sorted cargo is withdrawn from the to-be-sorted cargoes and/or the container storing the to-be-sorted cargoes.

The second sorting instruction includes a sorted cargo receiving sub-instruction and/or a sorted cargo transport sub-instruction. The transporting a sorted cargo to the first box according to the second sorting instruction specifically includes: receiving the sorted cargo withdrawn from the to-be-sorted cargoes and/or the container storing the to-be-sorted cargoes according to the sorted cargo receiving sub-instruction, and/or transporting the sorted cargo to the first box according to the sorted cargo transport sub-instruction.

In this embodiment of this application, the step may be performed by the processing terminal. In addition, the processing terminal may further perform the following steps:
  determining the quantity of sorted cargoes according to cargo quantity information in the order and/or capacity information of the sorting robot;
  determining a position of the first box according to a destination in the order; and
  transmitting the second sorting instruction according to the types of the sorted cargoes, the quantity of the sorted cargoes, and the position of the first box.

S306: Receiving the second sorting instruction, and transporting the sorted cargo to the first box according to the second sorting instruction, where the sorted cargo is withdrawn from the to-be-sorted cargoes and/or the container storing the to-be-sorted cargoes.

In this embodiment of this application, the step may be performed by the sorting robot. In addition, the sorting robot may further perform the following steps:
  arriving at a third target location according to the second sorting instruction, to receive the sorted cargo.
  Transporting the sorted cargo to a second target location according to the second sorting instruction includes:
  transporting the sorted cargo from the third target location to the second target location.

The second sorting instruction includes information of the second target location and information of the third target location. The second target location may be the sorting port where the first box is located. The third target location may be a position for receiving the sorted cargo.

In this embodiment of this application, the sorting robot may further perform the following steps:

receiving the sorted cargo receiving sub-instruction, and travelling to the third target location according to the sorted cargo receiving sub-instruction to receive the sorted cargo.

The second sorting instruction further includes the sorted cargo receiving sub-instruction.

In this embodiment of this application, the sorting robot may further perform the following steps:

receiving the sorted cargo transport sub-instruction, and transporting the sorted cargo to the second target location according to the sorted cargo transport sub-instruction.

The second sorting instruction further includes the sorted cargo transport sub-instruction.

In this embodiment of this application, the sorting robot may further perform the following steps:

receiving the sorted cargo, and determining whether the received cargo matches the types of the sorted cargo and/or the quantity of the cargoes; and if so, transporting the sorted cargo to the second box. The second sorting instruction further includes the types of the sorted cargoes and/or the quantity of the cargoes.

It is to be noted that, steps in the above various steps performed by a same execution subject such as the warehouse robot, the sorting robot, or the processing terminal may constitute a different embodiment of this application alone or in combination. Those of ordinary skill in the art may understand different protection scope supported by the different embodiments.

Since the above embodiment of the intelligent sorting method and the above embodiment of the intelligent sorting system are based on the same inventive concept, the corresponding contents and beneficial effects of the above embodiment of the intelligent sorting system are applicable to the intelligent sorting method embodiment, and therefore details are not described in detail herein again.

Figure 4:
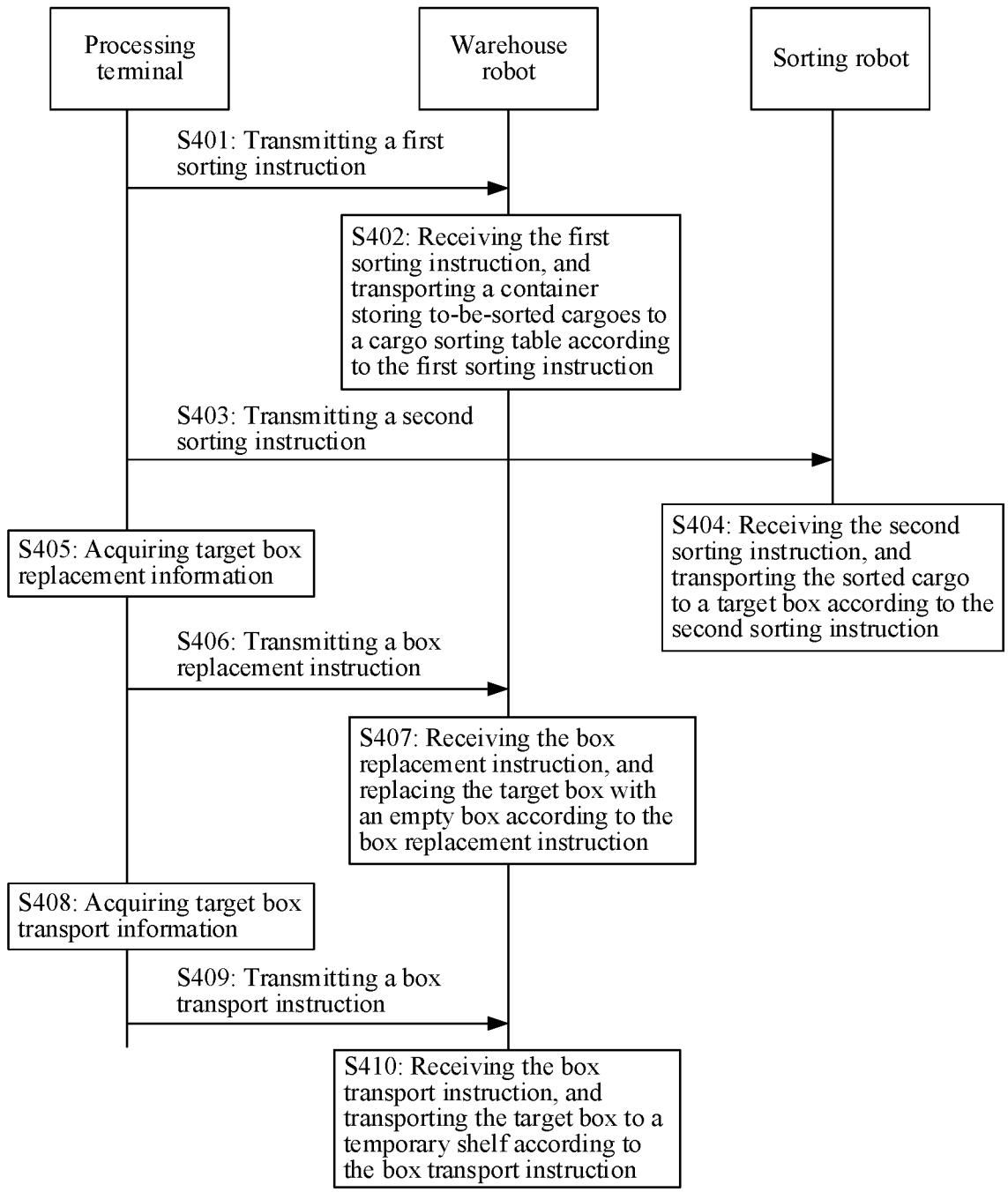
FIG. 4 is a schematic flowchart of an intelligent sorting method according to another embodiment of this application.

FIG. 4 is a schematic flowchart of an intelligent sorting method according to another embodiment of this application. The method is applicable to the apparatuses, such as the warehouse robot, the sorting robot, and the processing terminal in the above embodiment of the intelligent sorting system. The intelligent sorting method In this embodiment of this application may include: instructing, by the processing terminal, the warehouse robot to transport the to-be-sorted cargoes, for example, transport a container storing the to-be-sorted cargoes to a cargo sorting area, instructing, by the processing terminal, the sorting robot to transport a sorted cargo sorted from the to-be-sorted cargoes to a target box, and after the target box is filled with the cargoes, instructing the warehouse robot to replace the target box filled with the cargoes with an empty box. In addition, the processing terminal may further instruct the warehouse robot to transport the target box to a temporary shelf. As shown in FIG. 4, the method includes the following steps:

S401: Transmitting a first sorting instruction.

In this embodiment of this application, the step is performed by the processing terminal. The first sorting instruction is transmitted to the warehouse robot. The first sorting instruction is used for instructing the warehouse robot to transport the container storing the to-be-sorted cargoes to a cargo sorting table.

S402: Receiving the first sorting instruction, and transporting a container storing to-be-sorted cargoes to a cargo sorting table according to the first sorting instruction.

In this embodiment of this application, the step is performed by the warehouse robot. The warehouse robot receives the first sorting instruction transmitted by the processing terminal, and transports, according to the first sorting instruction, the container storing the to-be-sorted cargoes to the cargo sorting table, such as a supplied cargo handling table. The supplied cargo handling table sorts sorted cargoes from the container storing the to-be-sorted cargoes.

In addition, the warehouse robot may further perform the following step: transporting, according to the first sorting instruction, the container storing the to-be-sorted cargoes to the supplied cargo handling table, including:

moving, by the first warehouse robot, the to-be-sorted cargoes from the fixed shelf to the supplied cargo handling table according to the first sorting instruction, and/or moving, by the first warehouse robot, the cargo box storing the to-be-sorted cargoes from the fixed shelf to the supplied cargo handling table, according to the first sorting instruction, and/or moving, by the second warehouse robot, the movable shelf storing the to-be-sorted cargoes to the supplied cargo handling table according to the first sorting instruction, and/or moving, by the second warehouse robot according to the first sorting instruction, the movable shelf storing the box storing the to-be-sorted cargoes to the supplied cargo handling table.

The container includes the movable shelf, a case located on the fixed shelf and/or a case located on the movable shelf. The warehouse robot includes the first warehouse robot and/or the second warehouse robot.

A quantity of the to-be-sorted cargoes is determined according to a cargo quantity required in an order, and is not less than the quantity of the cargoes required in the order.

In this embodiment of this application, after sorting is completed, the warehouse robot may further perform the following steps:

receiving, by the first warehouse robot, a sorting completed instruction, and if there are to-be-sorted cargoes remained in the case and/or the first warehouse robot after the sorting is completed, transporting the case and/or the remaining to-be-sorted cargoes to an original storage location and/or a new storage location; and/or receiving, by the second warehouse robot, the sorting completed instruction, and if there are to-be-sorted cargoes remained in the case on the movable shelf and/or the movable shelf after the sorting is completed, transporting the movable shelf to an original storage location and/or a new storage location of the movable shelf, and/or transporting the case on the movable shelf to a new storage location.

S403: Transmitting a second sorting instruction.

In this embodiment of this application, the step is performed by the processing terminal. The second sorting instruction is transmitted to the sorting robot. The second sorting instruction is used for instructing the sorting robot to transport the sorted cargo to the target box.

In this embodiment of this application, the processing terminal may count quantities of various types of cargoes in an order requiring sorting, to determine the quantities of various to-be-sorted cargoes. Before the first sorting instruction and the second sorting instruction are transmitted, the processing terminal may directly determine a quantity of sorted cargoes according to quantity information of the cargoes in the order or capacity information of the sorting robot. The sorted cargo is withdrawn from the to-be-sorted cargoes. The processing terminal may determine the supplied cargo handling table according to container information in the information of the to-be-sorted cargoes. Different containers of the to-be-sorted cargoes may have different cargo supplied cargo handling table. The processing terminal may determine target boxes according to destinations in the order. Different orders have different delivery destinations. Therefore, the target boxes are respectively located at different sorting ports. The processing terminal may further transmit the second sorting instruction according to the types of the sorted cargoes, the quantities of the sorted cargoes and the target boxes. The second sorting instruction may include a sorted cargo transport sub-instruction and a sorted cargo receiving sub-instruction.

In this embodiment of this application, after the cargoes in the order are sorted, the completion of the sorting task may be determined by using the sorting completed instruction. The sorting completed instruction may be transmitted by the warehouse robot, or may be transmitted by an operating terminal of the supplied cargo handling table, or may be transmitted by the processing terminal.

S404: Receiving the second sorting instruction, and transporting a sorted cargo to a target box according to the second sorting instruction.

In this embodiment of this application, the step is performed by the sorting robot. The sorting robot receives the second sorting instruction transmitted by the processing terminal, and transports the sorted cargo to the target box according to the second sorting instruction. The target box is located at a sorting port, and is configured to receive the sorted cargo on the sorting robot.

In addition, the sorting robot may further perform the following step:

arriving at the supplied cargo handling table according to the second sorting instruction, to receive the sorted cargo.

The transporting the sorted cargo to the target box according to the second sorting instruction includes:

transporting the sorted cargo from the supplied cargo handling table to the target box.

The second sorting instruction includes location information of the supplied cargo handling table and location information of the target box.

In this embodiment of this application, the sorting robot may further perform the following steps:

receiving the sorted cargo receiving sub-instruction, and travelling to the supplied cargo handling table according to the sorted cargo receiving sub-instruction.

The second sorting instruction further includes the sorted cargo receiving sub-instruction.

In this embodiment of this application, the sorting robot may further perform the following steps:

receiving the sorted cargo transport sub-instruction, and transporting the sorted cargo to the target box according to the sorted cargo transport sub-instruction.

The second sorting instruction further includes the sorted cargo transport sub-instruction.

In this embodiment of this application, the sorting robot may further perform the following steps:

receiving the sorted cargo, and determining whether the received cargo matches the types of the sorted cargoes and/or the quantity of the cargoes; and if so, transporting the sorted cargo to the second target location.

The second sorting instruction further includes the types of the sorted cargoes and/or the quantity of the cargoes.

S405: Acquiring target box replacement information.

In this embodiment of this application, the step is performed by the processing terminal. The target box replacement information may include the location information of the target box, for example, a sorting port where the target box is located, so that the warehouse robot can find the to-be-replaced target box according to the location information. In addition, the sorting port of the target box may be locked, to stop sorting the cargoes into the target box. The target box information may further include target box identification information. The identification information may be used for determining whether the target box is consistent to the identification information on the target box, and/or performing alignment to the position of the target box according to the identification information. The target box information may be voluntarily reported to the processing terminal by the target box, or may be acquired by the processing terminal from corresponding information configured in an operating system.

S406: Transmitting a box replacement instruction.

In this embodiment of this application, the step is performed by the processing terminal. The box replacement instruction may include the target box replacement information. The box replacement instruction may be transmitted to the warehouse robot by the processing terminal. The processing terminal may transmit the box replacement instruction when the box is full or overweight or the sorting of the cargoes is completed. Definitely, the box replacement instruction may be transmitted when the box is required to be replaced. It may be determined by using a sensor whether the box is full or overweight. A sensing signal, such as a full signal or an overweight signal is sent to indicate a corresponding state and is reported to the processing terminal. The processing terminal may trigger the box replacement instruction after receiving the corresponding signal.

S407: Receiving the box replacement instruction, and replacing the target box with an empty box according to the box replacement instruction.

In this embodiment of this application, the step is performed by the warehouse robot. The warehouse robot includes the box storage unit and the handling assembly. The box replacement instruction may include information of to-be-replaced target box. For example, when the target box information includes the sorting port where the target box is located, and according to the box replacement instruction, the warehouse robot may travel to the sorting port where the target box is located, and instruct the handling assembly to move the target box to a target box storage unit and move the empty box to the sorting port.

S408: Acquiring target box transport information.

In this embodiment of this application, the step is performed by the processing terminal. The target box transport information may include a transported target box identification for identifying the target box required to be transported. The target box transport information may further include the delivery destination of the target box, for example, a specific location of the temporary storage shelf.

S409: Transmitting a box transport instruction.

In this embodiment of this application, the step is performed by the processing terminal. The box transport instruction includes transport information of the target box, to cause the warehouse robot to transport the target box to a temporary shelf according to the box transport instruction.

S410: Receiving the box transport instruction, and transporting the target box to a temporary shelf according to the box transport instruction.

In this embodiment of this application, the step is performed by the warehouse robot. The warehouse robot may include the handling assembly and the storage unit. The warehouse robot may move the target box to the storage unit of the warehouse robot by using the handling device from the storage location of the target box according to the box transport instruction, or the target box is directly place to the storage unit of the warehouse robot manually or by using a transport apparatus, and then transport the carried target box to the temporary storage shelf.

It is to be noted that, steps in the above various steps performed by a same execution subject such as the warehouse robot, the sorting robot, or the processing terminal may constitute a different embodiment of this application alone or in combination. Those of ordinary skill in the art may understand different protection scope supported by the different embodiments. In addition, since the above embodiment of the intelligent sorting method and the above embodiment of the intelligent sorting system are based on the same inventive concept, the corresponding contents and beneficial effects of the above embodiment of the intelligent sorting system are applicable to the intelligent sorting method embodiment, and therefore details are not described in detail herein again.

Figure 5:
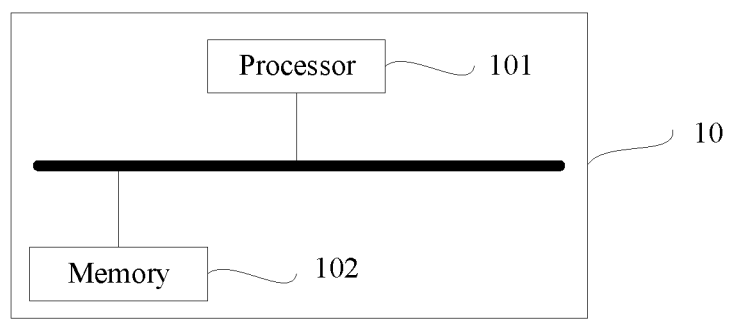
FIG. 5 is a schematic diagram of a warehouse robot according to an embodiment of this application.

FIG. 5 is a schematic diagram of a warehouse robot according to an embodiment of this application. The warehouse robot 10 may be a robot having a processing capability, and can perform the intelligent sorting method provided in the above corresponding method embodiment.

Specifically, referring to FIG. 5, the warehouse robot 10 include
one or more processors 101 and a memory 102 communicatively connected to at least one processor 101. In FIG. 5, one processor 101 is used as an example.

The processor 101 may be connected to the memory 102 by a bus or in other manners. In FIG. 5, connection by the bus is used as an example.

The memory 102 is a non-transient computer-readable storage medium, and may be configured to store a non-transient software program or a non-transient computer-executable program. Corresponding programs can perform corresponding steps (for example, S203 shown in FIG. 2, S302 and S304 shown in FIG. 3, and S402, S407, and S410 shown in FIG. 4) of the intelligent sorting method. The processor 101 executes the non-transient software program or an instruction stored in the memory 102 to perform the intelligent sorting method, that is, implement the intelligent sorting method described in the corresponding method embodiment.

The memory 102 may include a program storage area and a data storage area. The program storage area may store an operating system and an application program required for at least one function. The data storage area may store data created by the above intelligent sorting method. In addition, the memory 102 may include a high-speed random access memory (RAM), and may further include a non-transient memory, for example, at least one disk memory device, a flash memory device, or other non-transient solid state memory devices. In some embodiments, the memory 102 may optionally include memories remotely disposed relative to the processor 101. These remote memories may be connected to the warehouse robot 10 by a network. Examples of the above network include, but are not limited to, the Internet, an intranet, a local area network, a mobile communication network, and a combination thereof.

One or more modules are stored in the memory 102. The modules, when performed by the one or more processors 101, perform the intelligent sorting method in the above corresponding method embodiment, for example, S203 shown in FIG. 2, S302 and S304 shown in FIG. 3, and S402, S407, and S410 shown in FIG. 4 described above.

The warehouse robot may perform the intelligent sorting method in the above corresponding method embodiment, and has corresponding devices for performing the method and corresponding beneficial effects. For technical details not described in detail in the embodiment of the intelligent sorting method, refer to the description in the above corresponding embodiment of the intelligent sorting system.

Figure 6:
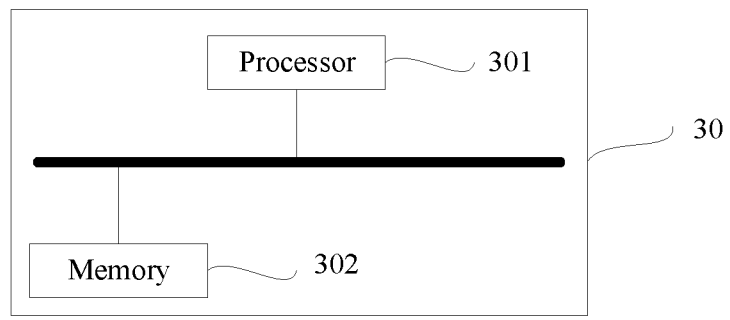
FIG. 6 is a schematic structural diagram of a processing terminal according to an embodiment of this application.

FIG. 6 is a schematic structural diagram of a processing terminal according to an embodiment of this application. The processing terminal 30 may be any type of electronic device. For example, the processing terminal may be a back-end server, a computer device having a processing capability, or a terminal device having a computing function or a dispatching function, and can perform the above intelligent sorting method provided in the corresponding method embodiment.

Specifically, referring to FIG. 6, the processing terminal 30 include
one or more processors 301 and a memory 302 communicatively connected to at least one processor 301. In FIG. 6, one processor 301 is used as an example.

The processor 301 may be connected to the memory 302 by a bus or in other manners. In FIG. 6, connection by the bus is used as an example.

The memory 302 is a non-transient computer-readable storage medium, and may be configured to store a non-transient software program or a non-transient computer-executable program. Corresponding programs can perform corresponding steps (for example, S201 shown in FIG. 2, S301, S303, and S305 shown in FIG. 3, and S401, S403, S405, S406, S408, and S409 shown in FIG. 4) of the intelligent cargo sorting method. The processor 301 executes the non-transient software program or an instruction stored in the memory 302 to perform the intelligent sorting method, that is, implement the intelligent sorting method described in the corresponding method embodiment.

The memory 302 may include a program storage area and a data storage area. The program storage area may store an operating system and an application program required for at least one function. The data storage area may store data created by the above intelligent cargo sorting method. In addition, the memory 302 may include a high-speed random access memory (RAM), and may further include a non-transient memory, for example, at least one disk memory device, a flash memory device, or other non-transient solid state memory devices. In some embodiments, the memory 302 may optionally include memories remotely disposed relative to the processor 301. These remote memories may be connected to the processing terminal 30 by a network. Examples of the above network include, but are not limited to, the Internet, an intranet, a local area network, a mobile communication network, and a combination thereof.

One or more modules are stored in the memory 302. The modules, when performed by the one or more processors 301, perform the intelligent cargo sorting method in the above corresponding method embodiment, for example, S201 in FIG. 2, S301, S303, and S305 in FIG. 3, and S401, S403, S405, S406, S408, and S409 in FIG. 4 of described above.

The processing terminal may perform the intelligent sorting method in the above corresponding method embodiment, and has corresponding devices for performing the method and corresponding beneficial effects. For technical details not described in detail in the embodiment of the intelligent sorting method, refer to the description in the above corresponding embodiment of the intelligent sorting system.

An embodiment of this application further provides a non-transient computer-readable storage medium. The non-transient computer-readable storage medium stores computer-executable instructions. The computer-executable instructions cause a computer to perform the intelligent sorting method in the above method embodiment. For example, the computer-executable instructions are executed by one or more processors, for example, executed by the processor 101 in FIG. 4, or executed by the processor 301 in FIG. 5. Therefore, the one or more processors can perform the intelligent sorting method in the above corresponding method embodiment, for example, functions of method steps S201, S203, and S205 in FIG. 2, S301, S302, S303, S304, and S305 in FIG. 3, and S401-S410 in FIG. 4 described above. In this way, the one or more processors can perform the intelligent sorting method in the above corresponding method embodiment.

An embodiment of this application further provides a computer program product. The computer program product includes a computer program stored in a non-transient computer-readable storage medium. The computer program includes program instructions. The program instructions, when executed by a computer, cause the computer to perform the intelligent sorting method in the above corresponding method embodiment. For example, functions of method steps S201, S203, and S205 in FIG. 2, S301, S302, S303, S304, and S305 in FIG. 3, and S401-S410 in FIG. 4 described above are performed.

The apparatus or device embodiments described above are merely illustrative. The units and the modules described as separate components may or may not be physically separate. The components displayed as the units and the modules may or may not be physical units. That is to say, the components may be located in one place, or may be distributed on a plurality of network modules and units. Part or all of the modules may be selected according to actual requirements to achieve the purposes of the solutions of the embodiments.

By means of the description of the above implementations, those skilled in the art can clearly understand that the implementations may be implemented by means of software and a general hardware platform, or definitely, may be implemented by means of hardware. Based on the understanding, the above technical solutions, in essence, or a part contributing to the related art may be embodied in a form of a software product. The computer software product may be stored in a computer-readable storage medium, such as a ROM/RAM, a magnetic disk, or an optical disk, and includes a plurality of instructions to cause a computer device (which may be a robot, a personal computer, a processing terminal, a network device, or the like) to perform the methods described in various embodiments or some parts of the embodiments.

Finally, it should be noted that the foregoing embodiments are merely intended for describing the technical solutions of this application rather than limiting this application. Under the ideas of this application, the technical features in the foregoing embodiments or different embodiments may also be combined, the steps may be performed in any order, many other changes of different aspects of this application also exist as described above, and these changes are not provided in detail for simplicity. Although this application is described in detail with reference to the foregoing embodiments, a person of ordinary skill in the art should understand that modifications may be still made to the technical solutions described in the foregoing embodiments or equivalent replacements may be made to some technical features thereof, as long as such modifications or replacements do not make the essence of corresponding technical solutions depart from the scope of the technical solutions of the embodiments of this application.

What is claimed is:

1. An intelligent sorting system, comprising a warehouse robot, wherein the warehouse robot comprises a box storage unit and a handling assembly, wherein
    the warehouse robot is configured to: receive a box replacement instruction comprising information of a first box, and instruct, according to the box replacement instruction, the handling assembly to replace the first box with a second box stored in the box storage unit,
    the information of the first box comprises a sorting port where the first box is located, the intelligent sorting system is configured to lock the sorting port where the first box is located according to the box replacement instruction, and the box storage unit further comprises a first box storage unit; and
    the warehouse robot is specifically configured to: travel to the sorting port where the first box is located, and instruct the handling assembly to move the first box to the first box storage unit and move the second box to the sorting port, according to the box replacement instruction,
    the box replacement instruction further comprises first box identification information, the warehouse robot further comprises a visual identification apparatus, the first box is equipped with identification information, and the warehouse robot is further configured to: acquire identification information on the first box by using the visual identification apparatus, and determine the first box depending on whether the identification information on the first box is same as the first box identification information comprised in the replacement instruction,
    the box replacement instruction further comprises information of a transport destination of the first box, and the warehouse robot is further configured to: transport the first box to the transport destination according to the box replacement instruction,
    the information of the transport destination comprises a preset location of a preset shelf, and the preset location is used for placing the first box, and corresponds to a delivery destination of the first box.

2. The system according to claim 1, wherein the box replacement instruction further comprises information of a second box storage location; and
    the warehouse robot is further configured to: travel to the second box storage location, and instruct the handling assembly to store the second box to the box storage unit, according to the box replacement instruction.

3. The system according to claim 1, wherein the information of the first box comprises a plurality of different sorting ports where a plurality of different first boxes are located, each first box corresponds to each sorting port, the box storage unit comprises a plurality of second box storage units, each second box storage unit stores the second box, and the warehouse robot is configured to: travel to the sorting port where any first box is located, and instruct the handling assembly to move the first box to the first box storage unit and move one of the second boxes to the sorting port, according to the box replacement instruction, wherein the process is repeated until the second boxes stored in the plurality of second box storage units are respectively placed in the sorting ports corresponding to different first boxes.

4. The system according to claim 1, wherein the warehouse robot is further configured to: after the second box is moved to the sorting port, transmit a sorting port release instruction and/or a box replacement completed instruction, to release the sorting port from a locked state.

5. The system according to claim 3, wherein
collect image information of the first box by using the visual identification apparatus, and perform alignment to a location of the first box according to the image information of the first box.

6. The system according to claim 1, wherein the warehouse robot is further configured to:
receive a first sorting instruction, and transport to-be-sorted cargoes and/or a container storing the to-be-sorted cargoes to a cargo sorting area according to the first sorting instruction.

7. The system according to claim 6, further comprising:
a sorting robot, configured to receive a second sorting instruction, and transport a sorted cargo to the first box according to the second sorting instruction, wherein the sorted cargo is withdrawn from the to-be-sorted cargoes and/or the container storing the to-be-sorted cargoes,
wherein the second sorting instruction comprises a sorted cargo receiving sub-instruction and/or a sorted cargo transport sub-instruction, and the sorting robot is specifically configured to:
receive the sorted cargo withdrawn from the to-be-sorted cargoes and/or the container storing the to-be-sorted cargoes according to the sorted cargo receiving sub-instruction; and/or
transport the sorted cargo to the first box according to the sorted cargo transport sub-instruction.

8. The system according to claim 1, further comprising: a processing terminal, wherein the processing terminal is configured to: transmit the box replacement instruction, wherein the box replacement instruction comprises information of a first box, and instruct, according to the box replacement instruction, the warehouse robot to replace the first box with the second box.

9. The system according to claim 8, wherein the processing terminal is further configured to:
transmit a first sorting instruction, to cause the warehouse robot to transport to-be-sorted cargoes and/or a container storing the to-be-sorted cargoes to a cargo sorting area.

10. The system according to claim 9, wherein the processing terminal is further configured to:
transmit a second sorting instruction, to cause the sorting robot to transport a sorted cargo to the first box according to the second sorting instruction, wherein the sorted cargo is withdrawn from the to-be-sorted cargoes and/or the container storing the to-be-sorted cargoes,
wherein the second sorting instruction comprises a sorted cargo receiving sub-instruction and a sorted cargo transport sub-instruction, and the processing terminal is specifically configured to:
receive the sorted cargo withdrawn from the to-be-sorted cargoes and/or the container storing the to-be-sorted cargoes according to the sorted cargo receiving sub-instruction, and
transport the sorted cargo to the first box according to the sorted cargo transport sub-instruction.

11. An intelligent sorting method, applicable to a warehouse robot of an intelligent sorting system, wherein the warehouse robot comprises a box storage unit and a handling assembly, the method comprising:
receiving a box replacement instruction, wherein the box replacement instruction comprises information of a first box; and
instructing, according to the box replacement instruction, the handling assembly to replace the first box with a second box stored in the box storage unit,
the box replacement instruction further comprises first box identification information, the warehouse robot further comprises a visual identification apparatus, the first box is equipped with identification information, and the method further comprises: acquire identification information on the first box by using the visual identification apparatus, and determine the to be replaced first box depending on whether the identification information on the first box is same as the first box identification information comprised in the replacement instruction,
the information of the first box comprises a sorting port where the first box is located, the intelligent sorting system is configured to lock the sorting port where the first box is located according to the box replacement instruction, the box storage unit further comprises a first box storage unit, and the instructing, according to the box replacement instruction, the handling assembly to replace the first box with a second box stored in the box storage unit comprises:
travelling, according to the box replacement instruction, to the sorting port where the first box is located; and
instructing the handling assembly to move the first box to the first box storage unit and move the second box to the sorting port,
the box replacement instruction further comprises information of a transport destination of the first box, and the method further comprises: transporting the first box to the transport destination according to the box replacement instruction,
the information of the transport destination comprises a preset location of a preset shelf, and the preset location is used for placing the first box, and corresponds to a delivery destination of the first box.

12. The method according to claim 11, wherein the box replacement instruction further comprises information of a second box storage location; and
the method further comprises:
travelling to the second box storage location, and instructing the handling assembly to store the second box to the box storage unit, according to the box replacement instruction.

13. The method according to claim 11, wherein the information of the first box comprises a plurality of different sorting ports where a plurality of different first boxes are located, each first box corresponds to each sorting port, the box storage unit comprises a plurality of second box storage units, and each second box storage unit stores the second box; and
the instructing, according to the box replacement instruction, the handling assembly to replace the first box with a second box stored in the box storage unit comprises:
travelling to the sorting port where any first box is located, and instruct the handling assembly to move the first box to the first box storage unit and moving one of the second boxes to the sorting port, according to the box replacement instruction, wherein the process is repeated until the second boxes stored in the plurality of second box storage units are respectively placed in the sorting ports corresponding to different first boxes.

14. The method according to claim 13, wherein after the moving the second box to the sorting port, the method further comprises:
transmitting a sorting port release instruction and/or a box replacement completed instruction, to release the sorting port from a locked state.

15. A warehouse robot, comprising:
at least one processor; and
a memory, communicatively connected to the at least one processor, wherein
the memory stores instructions executable by the at least one processor, and the instructions, when executed by the at least one processor, cause the at least one processor to perform the intelligent sorting method according to claim 11.

16. An intelligent sorting method, applicable to a processing terminal, the method comprising:
transmitting a box replacement instruction, wherein the box replacement instruction comprises information of a first box; and
instructing, according to the box replacement instruction, a warehouse robot to replace the first box with a second box,
the box replacement instruction further comprises first box identification information, the warehouse robot further comprises a visual identification apparatus, the first box is equipped with identification information, and the method further comprises: acquire identification information on the first box by using the visual identification apparatus, and determine the first box depending on whether the identification information on the first box is same as the first box identification information comprised in the replacement instruction,
the information of the first box comprises a sorting port where the first box is located; and
the instructing, according to the box replacement instruction, a warehouse robot to replace the first box with a second box comprises:
locking, according to the box replacement instruction, the sorting port where the first box is located; and
instructing the warehouse robot to move the first box to a first box storage unit of the warehouse robot and move the second box to the sorting port,
the box replacement instruction further comprises information of a transport destination of the first box, and the method further comprises:
instructing, according to the box replacement instruction, the warehouse robot to transport the first box to the transport destination.

17. The method according to claim 16, wherein box replacement instruction further comprises information of a second box storage location; and
the method further comprises:
instructing, according to the box replacement instruction, the warehouse robot to travel to the second box storage location, to cause the warehouse robot to store the second box to a box storage unit of the warehouse robot.

18. The method according to claim 16, further comprising:
receiving a sorting port release instruction and/or a box replacement completed instruction, to release the sorting port from a locked state.

19. The method according to claim 16, further comprising:
transmitting a first sorting instruction, to cause the warehouse robot to transport to-be-sorted cargoes and/or a container storing the to-be-sorted cargoes to a cargo sorting area.

20. The method according to claim 19, further comprising:
transmitting a second sorting instruction, to cause the sorting robot to transport a sorted cargo to the first box according to the second sorting instruction, wherein the sorted cargo is withdrawn from the to-be-sorted cargoes and/or the container storing the to-be-sorted cargoes,
wherein the second sorting instruction comprises a sorted cargo receiving sub-instruction and/or a sorted cargo transport sub-instruction, and the transporting a sorted cargo to the first box according to the second sorting instruction comprises:
receiving the sorted cargo withdrawn from the to-be-sorted cargoes and/or the container storing the to-be-sorted cargoes according to the sorted cargo receiving sub-instruction; and/or
transporting the sorted cargo to the first box according to the sorted cargo transport sub-instruction.

\* \* \* \* \*